(12) United States Patent
Collier

(10) Patent No.: US 11,989,257 B2
(45) Date of Patent: May 21, 2024

(54) ASSIGNING PROCESSING THREADS FOR MATRIX-MATRIX MULTIPLICATION

(71) Applicant: HEWLETT PACKARD ENTERPRISE DEVELOPMENT LP, Houston, TX (US)

(72) Inventor: Aaron M. Collier, Bloomington, MN (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 875 days.

(21) Appl. No.: 17/083,373

(22) Filed: Oct. 29, 2020

(65) Prior Publication Data
US 2022/0138281 A1     May 5, 2022

(51) Int. Cl.
G06F 17/16     (2006.01)
(52) U.S. Cl.
CPC .................... *G06F 17/16* (2013.01)
(58) Field of Classification Search
CPC ...... G06F 17/16; G06F 9/4806; G06F 9/5027; G06F 9/5061; G06F 3/064; G06F 3/0656
USPC ........................................................ 708/607
See application file for complete search history.

(56) References Cited

U.S. PATENT DOCUMENTS

| | | | |
|---|---|---|---|
| 8,924,455 B1 | 12/2014 | Barman et al. | |
| 10,073,815 B2 | 9/2018 | Zhou | |
| 10,354,733 B1 | 7/2019 | Zejda et al. | |
| 11,640,443 B2 * | 5/2023 | Collier | G06F 9/544 |
| | | | 708/607 |
| 2019/0392297 A1 | 12/2019 | Lau et al. | |
| 2021/0374208 A1 * | 12/2021 | Collier | G06F 9/5066 |

OTHER PUBLICATIONS

Gemm Tutorial; "OpenCL matrix-multiplication SGEMM tutorial"; Available at GitHub; https://cnugteren.github.io/tutorial/pages/page4.htlm; retrieved Oct. 13, 2020; 3 pp.
Liu, W. et al., "An Efficient GPU General Sparse Matrix-Matrix Multiplication for Irregular Data"; (Research Paper), IEEE 28th International Parallel and Distributed Processing Symposium, May 19-23, 2014, 5 Pgs.

(Continued)

*Primary Examiner* — Tan V Mai
(74) *Attorney, Agent, or Firm* — Trop, Pruner & Hu, P.C.

(57) ABSTRACT

An apparatus includes a processor and a memory to store instructions. The instructions, when executed by the processor, cause the processor to perform threading of a first matrix along a first dimension of the first matrix and a second dimension of the matrix. The threading represents block sizes of the first matrix to assign to process threads of a multiplication algorithm to determine a third matrix that represents a product of the first matrix and a second matrix. The block sizes include a first block size along the first dimension and a second block size along the second dimension. The second matrix shares the second dimension with the first matrix. The instructions, when executed by the processor, cause the processor to provide data to the multiplication algorithm, which represents the first block size and the second block size.

20 Claims, 11 Drawing Sheets

(56) References Cited

OTHER PUBLICATIONS

Matsumoto, Kazuya; "Multi-level Optimization of Matrix Multiplication for GPU-equipped Systems"; Procedia Computer Science, ScienceDirect, International Conference on Computational Science, ICCS 2011; 10 pp.

Nagasaka, Y. et al., "High-performance and Memory-saving Sparse General Matrix-Matrix Multiplication for NVIDIA Pascal GPU", (Research Paper), 46th International Conference on Parallel Processing (ICPP), Aug. 14-17, 2017, 5 Pgs.

* cited by examiner

ASSIGNING PROCESSING THREADS FOR MATRIX-MATRIX MULTIPLICATION

BACKGROUND

A given computer system may contain a specialized math library that provides programs to support arithmetic operations in a wide variety of engineering, data mining, numeric processing, data analytics and machine learning applications. One such program may implement a version of a generalized matrix-matrix multiplication (GEMM) algorithm for purposes of performing matrix-matrix multiplication. For some applications, the matrices involved with the matrix-matrix multiplications may be relatively large (e.g., a given matrix may have thousands or hundreds of thousands of rows and columns, if not more), resulting in a relatively large number of floating point multiplication operations for each matrix-matrix multiplication.

DETAILED DESCRIPTION

Figure 1:
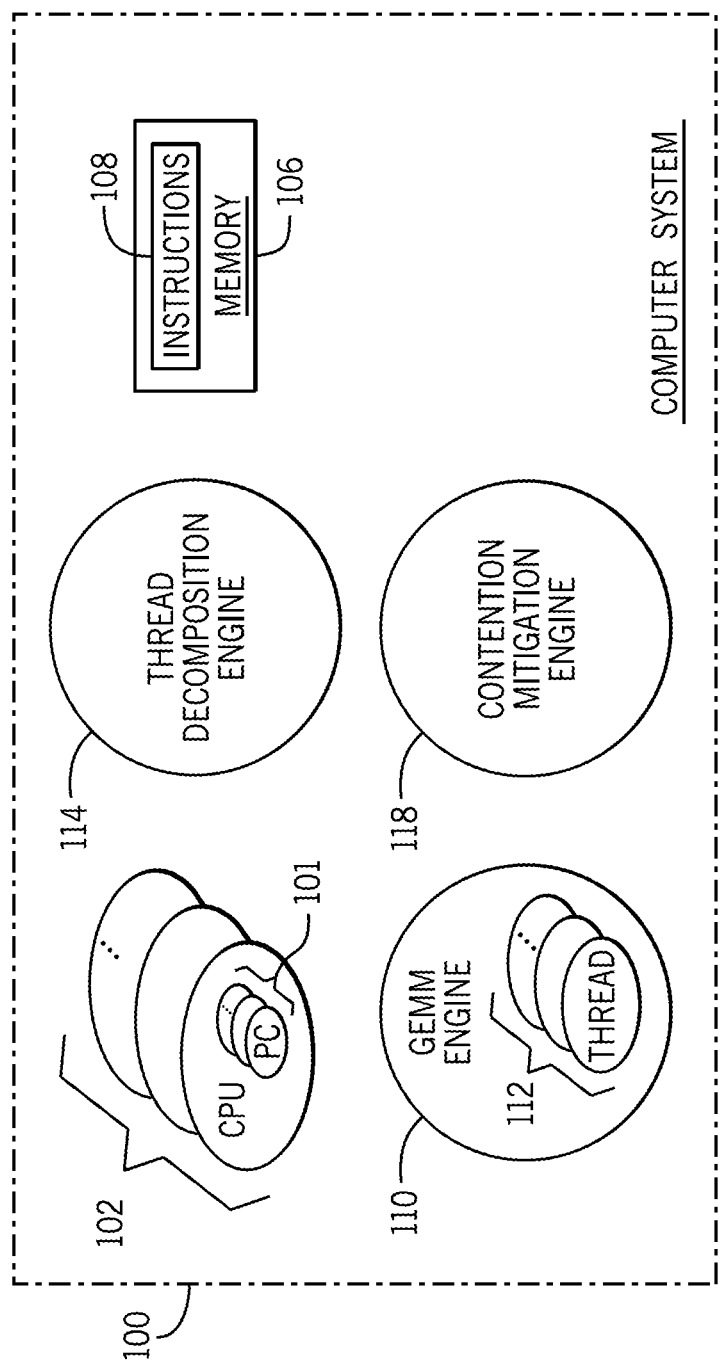
FIG. 1 is a schematic diagram of a computer system according to an example implementation.

The multiplication of two matrices (called "matrix-matrix multiplication" or "matrix multiplication" herein) may be performed in a computer system that has one or multiple multicore central processing unit (CPU) semiconductor packages (or "chips"). The CPU semiconductor package may contain multiple CPU processing cores that have access to local on-chip memory. Moreover, the CPU semiconductor package may employ a non-uniform memory access (NUMA) architecture. In general, a NUMA architecture recognizes that processing nodes have faster access times to local memories than to non-local memories. Accordingly, in a NUMA architecture, the processing cores may be grouped according to NUMA domains, such as the processing cores of each NUMA domain perform most of their computations using local memory accesses. The NUMA domain may have one or multiple cache levels so that access to the local on-chip memory may be made more efficient by storing more recently accessed data in faster cache memory.

For matrix-matrix computations, the computer system may employ a generalized matrix-matrix multiplication (GEMM) algorithm that relies on different processing threads (on corresponding NUMA nodes and sockets) for performing different parts of the multiplication. Matrix-matrix multiplication may involve multiplying considerably large matrices, which contain thousands, if not hundreds of thousands (if not more) of rows and columns.

For purposes of accommodating such computationally extensive operations, a process called "threading" may be used to distribute the different parts of the matrix-matrix multiplication processing workload among processing threads of the computer system. In this context, a "processing thread" (or "thread") refers to a unit of machine executable instructions that is assigned to a processing core of the computer system. The processing threads may be executed in parallel (i.e., at the same time) by the processing cores that are assigned to the processing threads.

In the context of this disclosure, "threading" refers to assigning the processing workload of matrix-matrix multiplication to different processing threads of the computer system. The threading may, for example, partition the input matrices involved in the matrix-matrix multiplication and assign the resulting partitions to corresponding processing threads.

One type of threading is "M/N" threading, in which the matrix partitioning is performed along the M and N dimensions to form corresponding M×N sub-matrices, or blocks, which are assigned to different processing threads. Here, the "M dimension" refers to a row dimension of an input matrix A, and the "N dimension" refers to a column dimension of an input matrix B of a matrix-matrix multiplication defined as follows: A×B=C, where "C" represents the output matrix, or the result of the matrix-matrix multiplication. Accordingly, the output matrix C has a dimension of M×N, or M rows by N columns. The input matrix A and the input matrix B share a common dimension, which is referred to as the "K dimension" herein. More specifically, the K dimension is the column dimension of the input matrix A and the row dimension of the input matrix B.

A challenge with M/N threading is that the resulting units of data that correspond to the sub-matrices may be too small to effectively utilize the cache (e.g., cache line boundaries of a last level cache (LLC) of the CPU). Accordingly, due to cache underutilization, there may not be enough data cached to amortize the cost of data movement from main system memory, resulting in slower processing of the matrix-matrix multiplication.

In accordance with example implementations that are described herein, threading is performed over the K dimension, i.e., the dimension shared in common by the input matrices. More specifically, in accordance with example implementations, a thread decomposition with adaptive K dimension blocking engine (called a "thread decomposition engine" herein) provides processing thread assignments to a GEMM algorithm. The corresponding sub-matrices, or sub-blocks, are sized to enhance cache memory utilization and in general, decrease processing times for matrix-matrix multiplication. The thread decomposition engine, in accordance with example implementations, assigns processing threads to sub-matrices, or blocks, based on a two-dimensional matrix partitioning, where one dimension is the K dimension and the other dimension is either the M dimension or the N dimension.

The K dimension-based threading that is described herein may be in one of two forms: "M/K threading," which refers to a threading in which processing threads are assigned to respective matrix blocks that are derived by partitioning along the M and K dimensions; and "N/K threading," which refers to a threading in which the processing threads are assigned to matrix blocks that are derived by matrix partitioning along the N and K dimensions. The M/K or N/K processing thread assignment results in block sizes that are closer to or correspond to optimal cache block sizes, i.e., block sizes that result in more cache hits and better utilization of cache memory when performing the matrix-matrix multiplication, as compared to M/N threading. Moreover, in accordance with example implementations, the thread decomposition engine performs the partitioning along the K dimension in an adaptive manner that takes into account optimal cache block sizes.

As also described herein, in accordance with example implementations, a contention mitigation engine provides further information to the GEMM algorithm, which reduces, if not eliminates memory contention among processing threads when processing the matrix-matrix multiplication. More specifically, in accordance with example implementations, the contention mitigation engine further sub-divides, or partitions, along the M and/or N dimensions to create sub-blocks of each M×N block of the output matrix C. Each processing thread may "sub-cycle" over the corresponding sub-blocks. As a result of the sub-blocks and sub-cycling, memory resource contention among a "K group" of processing threads may be reduced. In this context, a "K group" of processing threads refers to all of the processing threads that contribute to a given M×N block of the output matrix C.

Moreover, in accordance with example implementations, as a further measure to reduce memory resource contention, the contention mitigation engine recommends whether or not a K group of processing threads should each use a local temporary buffer (i.e., a "scratchpad" buffer) to determine results for a corresponding M×N block of the output matrix C. If the K group of processing threads use local temporary buffers, then each processing thread of the K group uses the local temporary buffer to determine a contribution to the M×N block of the output matrix C, and the contributions from the local temporary buffers may then be transferred via additive updates to the final output buffer for the output matrix C.

Figure 2:
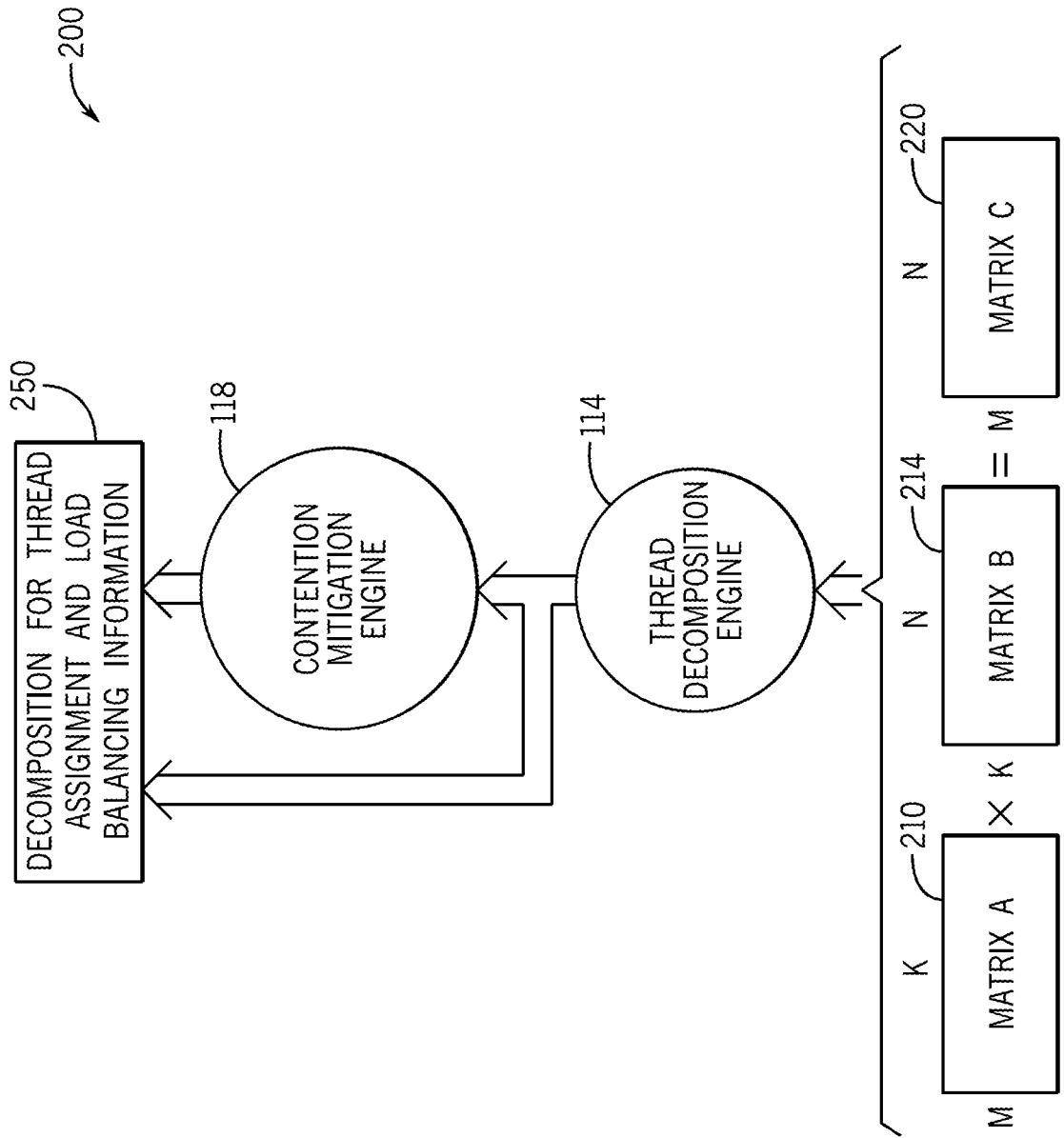
FIG. 2 is a flow diagram depicting a process used by a thread decomposition engine and a contention mitigation engine of the computer system of FIG. 1 according to an example implementation.

Referring to FIG. 1, as a more specific example, in accordance with some implementations, a computer system 100 may include a GEMM engine 110. In this context, the "GEMM engine 110" represents a software-driven engine in which multiple parallel processing threads 112 collectively apply a GEMM algorithm to perform matrix-matrix multiplication. Referring to FIG. 2 in conjunction with FIG. 1, for example implementations that are described herein, the matrix-matrix multiplication refers to the multiplication of an input matrix A 210 and an input matrix B 214 to determine an output matrix C 220. In other words, the GEMM engine 110 determines the product described by the following matrix-matrix multiplication: A×B=C.

The input matrix A 210 has rows along a row dimension M (i.e., M rows that are indexed by an M index) and columns along a K dimension (i.e., K columns that are indexed by a K index). The input matrix B 214 has rows along the K dimension (i.e., K rows that are indexed by the K index) and columns along the N dimension (i.e., N columns that are indexed by an N index). As such, the input matrix A 210 and the input matrix B 214 share a common dimension K. The output matrix C 220 has rows along the M dimension (i.e., M rows that are indexed by the M index) and columns along the N dimension (i.e., N columns that are indexed by the N index).

To configure the GEMM engine 110 (FIG. 1) to perform the matrix-matrix multiplication, the GEMM engine 110 receives data 250, which, in accordance with example implementations, represents assign processing thread assignments and may represent other parameters to further enhance the matrix-matrix multiplication processing, as further described herein. In accordance with example implementations, at least part of the data 250 is provided by a thread decomposition engine with adaptive K threading engine 114 (called a "thread decomposition engine 114" herein). The thread decomposition engine 114 analyzes the row and column sizes of the matrices 210, 214 and 220 using certain criteria, as described herein, to provide parameters (called "BSM," BSN" and "BSK" herein) that represent a matrix partitioning for the assignment of processing threads 112. In accordance with example implementations, the partitioning is performed along the K dimension and along either the N or M dimension.

The BSM parameter (called a "BSM block size" herein) represents a number of rows in the M dimension for each matrix partition, or block. The BSN parameter (called a "BSN block size" herein) represents a number of columns along the N dimension for each matrix block. The BSK parameter (called a "BSK block size" herein) represents a number of rows/columns (depending on whether for the input matrix A 210 or the input matrix B 214) along the K dimension for a matrix partition, or block.

In accordance with example implementations, for a given matrix-matrix multiplication, the thread decomposition engine 114 performs either M/K threading (corresponding to matrix partitioning along the M and K dimensions) or N/K threading (corresponding to matrix partitioning along the N and K dimensions) to determine the matrix blocks that are assigned to the processing threads 112. For N/K threading, the thread decomposition engine 114 partitions the input matrix B 214 into blocks of size BSK×BSN (i.e., each block has a size of BSK rows by BSN columns); and each BSK×BSN block of the input matrix B 214 is assigned to a different corresponding processing thread 112. More specifically, the thread decomposition engine 114 provides the following block sizes as a result of the N/K threading: a BSN block size that represents the number of columns along the N dimension per matrix block; a BSK block size that represents a number of rows/columns along the K dimension per matrix block; and the default BSM block size because partitioning for work sharing does not occur in the M dimension for N/K threading. Each processing thread 112 processes operations of the matrix-matrix multiplication pertaining to its assigned BSK×BSN block of the input matrix B 214 to derive a corresponding BSM×BSN block of the output matrix 220.

For M/K threading, the thread decomposition engine 114 partitions the input matrix A 210 into blocks, and each BSM×BSK block of the input matrix A 210 is assigned to a different corresponding processing thread 112. More specifically, the thread decomposition engine 114 provides the following block sizes for M/K threading: a BSM block size that represents the number of rows along the M dimension per matrix block; a BSK block size that represents a number of rows/columns along the K dimension per matrix block; and the default BSN block size because partitioning for work sharing does not occur in the N dimension for M/K threading. Each processing thread 112 processes operations of the matrix-matrix multiplication pertaining to its assigned BSM×BSK block of the input matrix A 210 to derive a corresponding BSM×BSN block of the output matrix 220.

As a more specific example, the thread decomposition engine 114 may apply N/K threading to determine assignments for sixteen processing threads 112. For this example, the matrices may have the following dimensions: input matrix A 210 may have 96 rows along the M dimension and 3,840 columns along the K dimension, represented by the M×K dimensions of "(96×3,840)"; the input matrix B 214 may have K×N dimensions of (3,840×192); and the output matrix C 220 may have the corresponding M×N dimensions of (96×192). The thread decomposition engine 114 may evaluate these dimensions, as further described herein, and determine that the BSM, BSN and BSK block sizes are 96, 48 and 960, respectively. As such, the sixteen processing threads 112 for this example are assigned to the sixteen 48×960 blocks of the input matrix B.

Figure 3:
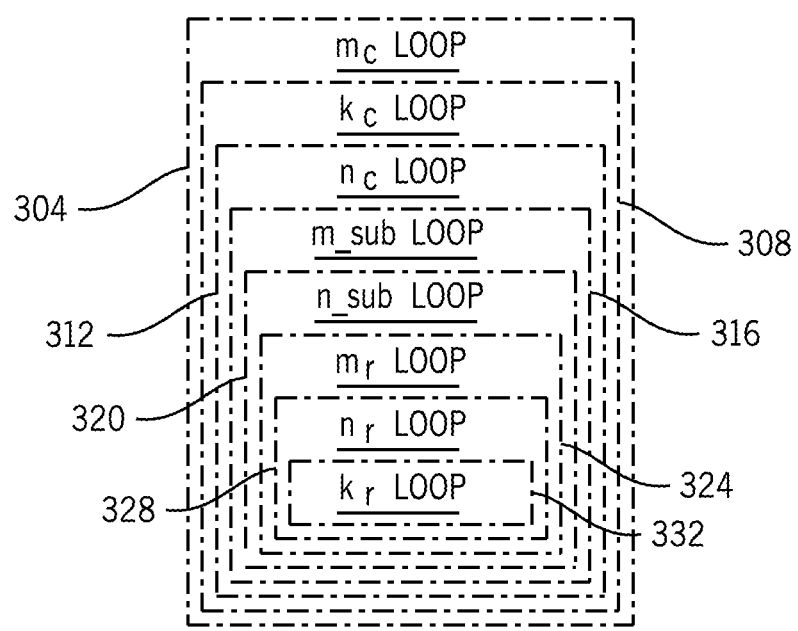
FIG. 3 is an illustration of nested processing loops of a generalized matrix-matrix multiplication (GEMM) algorithm according to an example implementation.

Referring to FIG. 3 in conjunction with FIG. 1, in accordance with some implementations, the processing of the matrix-matrix multiplication by the GEMM engine 110 follows nested processing loops. In this regard, FIG. 3 depicts an outer $m_c$ loop 304, which refers to the processing in the M dimension. For M/K threading, a given processing thread 112 process operations for its assigned BSM×BSK block as the processing thread 112 indexes over the K dimension and N dimension in the inner corresponding $k_c$ loop 308 and inner $n_c$ loop 312, respectively. For N/K threading, a given processing thread 112 process operations for its assigned BSN×BSK block as the processing thread 112 indexes over the M dimension and the K dimension in the corresponding $m_c$ loop 304 and $k_c$ loop 308, respectively.

FIG. 3 also depicts the following three nested innermost loops, which are part of the macro kernel of the GEMM engine 110: an $m_r$ loop 324, an $n_r$ loop 328 and a $k_r$ loop 332. In the loops 324, 328 and 332, the processing thread 112 iterates over the M, N and K dimensions, respectively, for a given BSM×BSN block of the output matrix C 220 (FIG. 2). Sub-cycling introduces two processing loops outside of the macro kernel of the GEMM engine 110: an m_sub loop 316, which corresponds to the sub-cycling over the M dimension and an n_sub loop 320, which corresponds to the sub-cycling over the N dimension. More specifically, referring to FIG. 2 in conjunction with FIG. 1, in accordance with example implementations, a contention mitigation engine 118 of the computer system 100 subdivides the BSM and BSN block sizes into corresponding sub-matrices, or sub-blocks, with dimensions of $BSM_{sub}$ and $BSN_{sub}$, respectively. The GEMM engine 110 includes the following nested loops to perform the sub-cycling: an m_sub loop 316 to sub-cycle over the $BSM_{sub}$-sized sub-blocks of each matrix block, and an n_sub loop 320 to sub-cycle over the $BSN_{sub}$-sized sub-blocks of each matrix block. In accordance with example implementations, $BSM_{sub}$ and $BSN_{sub}$ could be BSMR and BSNR, respectively. As described further herein, in accordance with example implementations, this sub-cycling may prevent memory contention by a K group of processing threads 112 when the processing threads 112 collectively process a BSM×BSN block of the output matrix C 220.

In addition to providing the $BSM_{sub}$ and $BSN_{sub}$ sizes as part of the data 250, the contention mitigation engine 118 may, in accordance with example implementations, provide a recommendation to the GEMM engine 110 regarding whether to use a temporary local output buffer. In this context, the "temporary output buffer" refers to a "scratch-pad" buffer that may be used by each processing thread of a K group of processing threads that collectively process a particular BSM×BSN block of the output matrix C 220. Instead of each processing thread 112 of the K group of processing threads 112 making its updates for the BSM×BSN block in a final result buffer, the processing thread 112 instead updates the temporary output buffer. Moreover, in accordance with example implementations, the temporary local output buffer is optimally aligned with cache boundaries. When the K group of processing threads 112 have finished processing of the BSM×BSN block of the output matrix C 220 and the temporary local output buffer stores the complete result for the sub-block of the output matrix, then the content of the temporary buffer may be transferred (e.g., via an update routine of the GEMM engine 110 and additive updates) to a final output buffer for the matric C 220.

Referring back to FIG. 1, the GEMM engine 110, the thread decomposition engine 114 and the contention mitigation engine 118 may be provided by any of a number of different computer architectures, in accordance with the many possible implementations. For the example implementation of FIG. 1, the computer system 100 includes one or multiple central processing units (CPUs) 102 (e.g., CPU semiconductor packages, or "chips"), with each CPU 102 including a set of processing cores 101. In accordance with some implementations, a number of processing cores 101 on a given CPU 102 may form a corresponding NUMA domain; and there may be multiple NUMA domains per CPU 102.

In accordance with further example implementations, processing cores other than CPU processing cores may be used. In this manner, in accordance with further implementations, the processing core 101 may a graphics processing unit (GPU) core, a field programmable gate array (FPGA), a node accelerator core, and so forth.

In accordance with example implementations, the computer system 100 may be formed from one or multiple physical machines, where each physical machine is made, or formed from, actual software and actual hardware. In this manner, in accordance with example implementations, each physical machine may include one or multiple CPUs 102 and a memory. Collectively, the memories of the physical machine(s) are represented in FIG. 2 by a memory 106. As an example, the memory 106 may store machine executable instructions 108 that, when executed by the CPU(s) 102, form one or multiple software components that are described herein, such as the GEMM engine 110, the thread decomposition engine 114 and the contention mitigation engine 118.

In accordance with example implementations, the memory 106 may store data, such as, as examples, data representing an input matrix A; data representing an input matrix B; data representing intermediate and final results of an output matrix C; data representing temporary local output buffers; data representing parameters that are described herein, such as block sizes, sub-block sizes and so forth; data representing block assignments for the processing threads 112; and so forth.

The memory 106, in general, is a non-transitory storage medium that may be formed from semiconductor storage devices, memristor-based storage devices, magnetic storage devices, phase change memory devices, a combination of storage devices corresponding to one or more of these storage technologies, and so forth. Moreover, the memory 106 may be a volatile memory, a non-volatile memory, or a combination of different storage types, such as a volatile memory and/or a non-volatile memory.

The physical machine(s) of the computer system 100 may take on many different forms, such as one or multiple rack-mounted modules, one or multiple server blades, a desktop computer, a laptop computer, a tablet computer, a smartphone, a wearable computer, and so forth. Depending on the particular implementation, the GEMM engine 110, thread decomposition engine 114 and contention mitigation engine 118 may be formed from an entire physical machine, multiple physical machines, or portion(s) thereof. Moreover, in accordance with some implementations, the GEMM engine 110, thread decomposition engine 114 and contention mitigation engine 118 may include and/or correspond to one or multiple virtual components or one or multiple virtual environments of an actual physical machine, such as one or multiple virtual machines, one or multiple containers, and so forth.

Figure 5A:
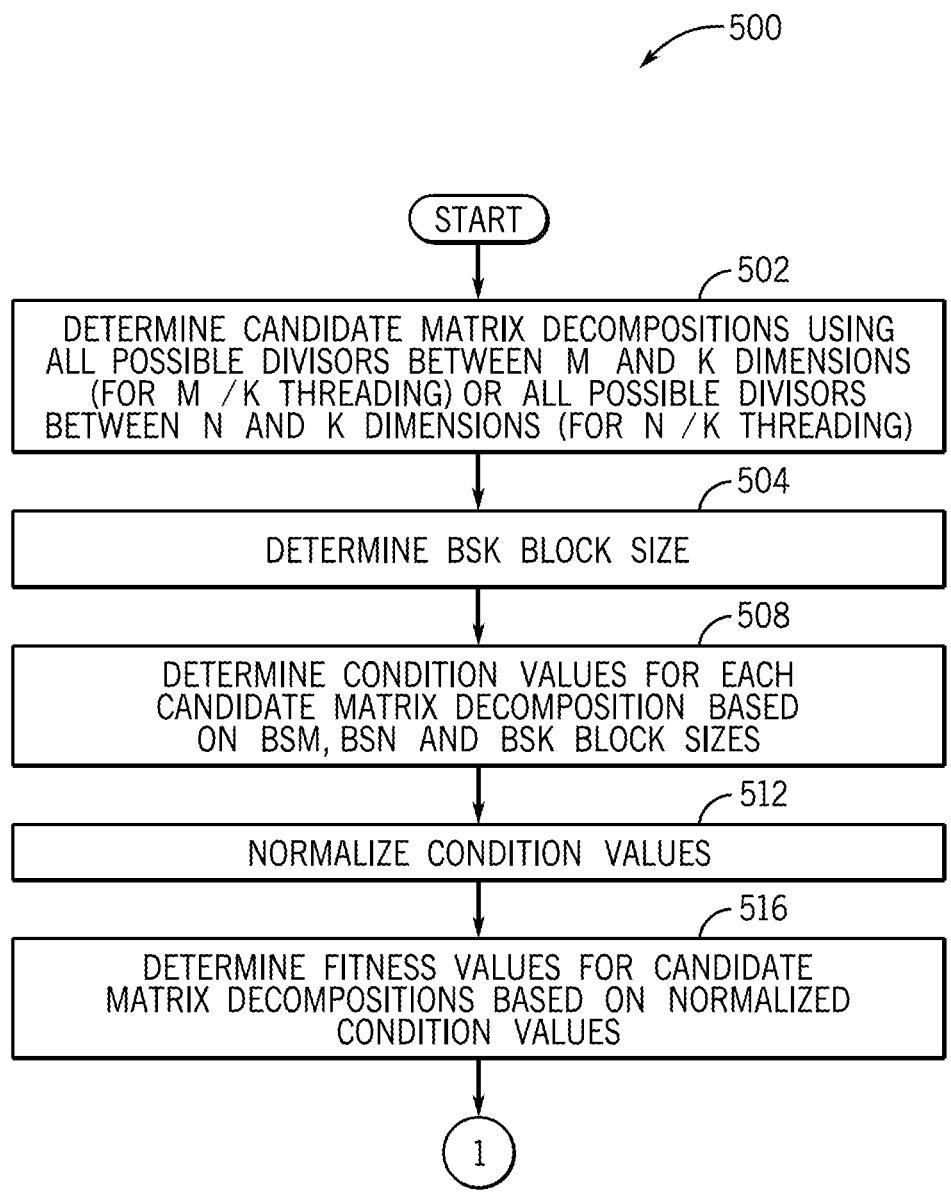
FIGS. 5A and 5B illustrate a flow diagram of a process to perform adaptive K dimension threading according to an example implementation.
Figure 5B:
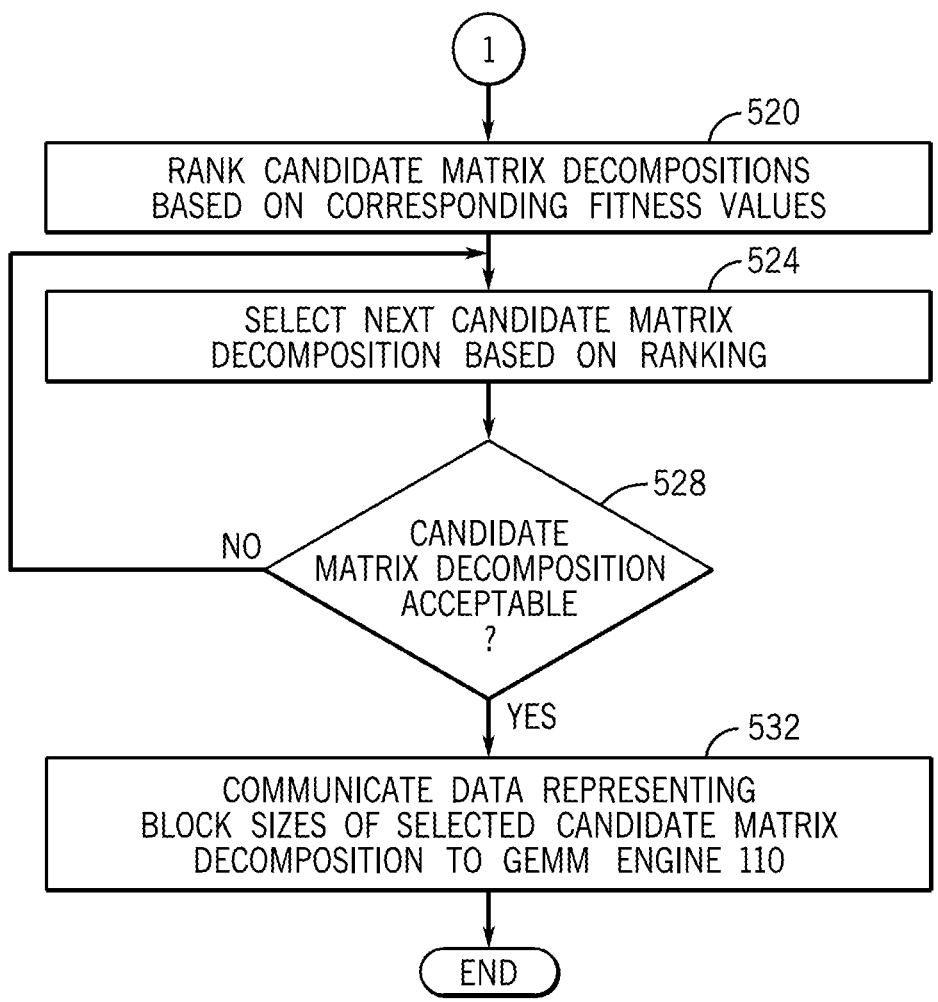

In accordance with example implementations, the thread decomposition engine 114 performs a process 500, which is depicted in FIGS. 5A and 5B, for purposes of determining either the BSM and BSK block sizes (for M/K threading) or the BSN and BSK block sizes (for N/K threading). In general, the determination of the block sizes has two parts: a first part in which the thread decomposition engine 114 determines candidate matrix decompositions (block 502) and the BSK block size (block 504); and a second part (i.e., the remaining part of the process 500) in which the thread decomposition engine 114 performs an iterative process, which evaluates the candidate matrix decompositions for purposes of determining the remaining BSM block size (for M/K threading) or the BSN block size (for N/K threading).

Turning now to specific example, in accordance with some implementations, thread decomposition engine 114 may determine the BSK block size (pursuant to block 504 of FIG. 5A) as follows. First, the thread decomposition engine 114 initially defines the BSM, BSN and BSK block sizes as follows (where the "init" subscript denotes the initial state):

$$BSM_{init}=\min(BSM_{opt}, M), \quad \text{Eq. 1}$$

$$BSN_{init}=\min(BSN_{opt}, N), \text{ and} \quad \text{Eq. 2}$$

$$BSK_{init}=\min(BSK_{opt}, K). \quad \text{Eq. 3}$$

In these equations, "$BSM_{opt}$," "$BSN_{opt}$," and "$BSK_{opt}$" represent optimal values for the BSM, BSN and BSK block sizes, respectively; and "min( )" represents the minimum function, i.e., a function that selects the minimum value of a tuple of multiple values. In this context, an optimal block size refers to a number of rows or columns that corresponds to a unit of data that is aligned with or nearly aligned with cache line boundaries. Therefore, in accordance with example implementations, the optimal block size may, for example, be a function of the cache architecture (e.g., an architecture of a last level cache (LLC) and the sizes of the matrix entries.

For M/K threading, the thread decomposition engine 114 may determine several parameters that are used in the derivation of the BSK block size. These parameters include a number (called "nblk") of BSN-sized blocks in the N dimension; the number called "mblk_max" of BSMR-sized blocks in the M dimension, where "BSMR" represents the smallest possible sub-block size (i.e., M rows) of the output matrix C; a re-determined BSM block size; and a number (called "mblk") of BSM-sized blocks in the M dimension:

$$n\text{blk}=\text{ceil}(N/BSN), \quad \text{Eq. 4}$$

$$m\text{blk\_max}=\text{ceil}(M/BSMR), \quad \text{Eq. 5}$$

$$BSM=\min(BSM_{init}, \text{ceil}(m\text{blk\_max}/\text{div\_m})*BSMR), \text{ and} \quad \text{Eq. 6}$$

$$m\text{blk}=\text{ceil}(M/BSM). \quad \text{Eq. 7}$$

In these equations, "ceil( )" represents the application of a ceiling, or limiting function; "div_m" represents the number of threads in the M dimension; "N" represents the number of columns of the input matrix B; and "M" represents the number of rows of the input matrix A.

In accordance with example implementations, there is a preference for the number of M blocks to be an integer multiple of the number of threads in the M dimension; and in accordance with this preference, the thread decomposition engine 114 evaluates the following equality:

$$\text{if}(m\text{blk}>\text{div\_m})m\text{blk}=\text{ceil}(m\text{blk}/\text{div\_m})*\text{div\_m}.$$

Then the thread decomposition engine determines the corresponding number (called "div_k" herein) of threads in the K dimension as follows:

$$\text{div\_k}=\text{maxth}/\text{div\_m}, \quad \text{Eq. 8}$$

where "maxth" represents the total number of the processing threads.

For N/K threading, in accordance with example implementations, the thread decomposition engine 114 determines the mblk number as follows:

$$m\text{blk}=\text{ceil}(M/BSM). \quad \text{Eq. 9}$$

Moreover, in accordance with example implementations, for N/K threading, the thread decomposition engine 114 determines the number (called "nblk_max" herein) of BSNR-size blocks in the N dimension, where "BSNR" represents the smallest possible sub-block size along the N dimension of the output matrix C; the BSN block size; and the number (called "nblk" herein) of BSN-sized blocks in the N dimension as follows:

$$n\text{blk\_max}=\text{ceil}(N/BSNR), \quad \text{Eq. 10}$$

$$BSN=\min(BSN_{init}, \text{ceil}(n\text{blk\_max}/\text{div\_n})*BSNR, \text{ and} \quad \text{Eq. 11}$$

$$n\text{blk}=\text{ceil}(N/BSN). \quad \text{Eq. 12}$$

In accordance with example implementations, there is a preference for the number of N blocks to be an integer multiple of a number of threads in the N dimension; and accordingly, in accordance with example implementations, the thread decomposition engine 114 evaluates the following equality:

$$\text{If}(n\text{blk}>\text{div\_n})n\text{blk}=\text{ceil}(n\text{blk}/\text{div\_n})*\text{div\_n}.$$

Then, in accordance with example implementations, the thread decomposition engine 114 determines the div_k number of threads in the K dimension as follows:

$$\text{div\_k}=\text{maxth}/\text{div\_n}. \quad \text{Eq. 13}$$

In accordance with example implementations, regardless of whether M/K or N/K threading is used, the thread decomposition engine 114 dynamically adjusts the value of the BSK block size for purposes of optimizing efficiency. For an out-of-place/copy GEMM kernel (i.e., a GEMM kernel, which copies the input matrices A and B into buffers for contiguous memory access), the thread decomposition engine 114 determines an optimal resident size of the packing buffers for the input matrices A and B as follows:

$$\text{Packing Buffer Size}=BSK_{opt}*(BSM_{opt}+BSN_{opt}). \quad \text{Eq. 14}$$

Using the optimal resident size of the packing buffers, the thread decomposition engine 114 may determine the maximum possible BSK block size as follows:

$$BSK = BSK_{opt} * (BSM_{opt} + BSN_{opt})/(BSM + BSN), \quad \text{Eq. 15}$$

$$BSK = \text{ceil}(BSK/BSKR) * BSKR, \quad \text{Eq. 16}$$

$$BSK = \min(BSK, K), \text{ and} \quad \text{Eq. 17}$$

$$k\text{blk} = \text{ceil}(K/BSK), \quad \text{Eq. 18}$$

where "BSKR" represents the unroll factor of the innermost K loop 324 (FIG. 3) in the macro-kernel. Unrolling is a loop transformation technique to improve performance by completing multiple iterations per loop trip, and the "unroll factor" refers to the number of iterations per loop trip.

In accordance with example implementations, the thread decomposition engine 114 may then adjusts the BSK block size as follows. For M/K threading, the thread decomposition engine 114 evaluates the following equality:

if(div_k>kblk) AND if(nblk*kblk % div_k!=0)
    kblk=div_k.

If the above equality is TRUE, then, in accordance with example implementations, the thread decomposition engine 114 uses the optimal BSK, determined as set forth above, because there are enough N blocks for equal work distribution.

For N/K threading, determines the following equality:

If(div_k>kblk) AND if(mblk*kblk % div_k!=0)
    kblk=div_k.

If the equality is TRUE, then the thread decomposition engine 114 calculates another BSK block size, as set forth below. Otherwise, the optimal BSK block size may be used because there are enough M blocks for equal work distribution.

If the thread decomposition engine 114 determines that the optimal BSK block size cannot be used, then, in accordance with example implementations, the thread decomposition engine 114 recomputes the BSK block size as follows:

$$BSK = \min(BSK, \text{ceil}(\text{ceil}(K/BSKR)/k\text{blk}) * BSKR). \quad \text{Eq. 19}$$

The thread decomposition engine 114 may then determine the number of threads in the K dimension as follows:

$$k\text{blk} = \text{ceil}(K/BSK). \quad \text{Eq. 20}$$

Still referring to FIG. 5A, in accordance with example implementations, the thread decomposition engine 114 determines (block 502) candidate matrix decompositions using all possible divisors of the number of threads divided between the M and K dimensions (for M/K threading) or in the N and K dimensions (for N/K threading). The thread decomposition engine 114 determines (block 508) condition values for each candidate matrix decomposition based on the BSM, BSN and BSK block sizes. It is noted that, in accordance with example implementations, if the M/K threading is used, the default BSN block size is used; and if N/K threading is used, then the default BSM block size is used.

Pursuant to block 512, the thread decomposition engine 114 normalizes the condition values. In this context, to "normalize" a particular condition value refers to determining a maximum of the condition value for each of the candidate matrix decompositions and normalizing the condition values based on the maximum. This, in turn, effectively, weights the condition values for a particular condition value category. The thread decomposition engine 114 then determines the fitness value for each candidate matrix decomposition based on the normalized condition values (e.g., the thread decomposition engine 114 adds the normalized condition values together), pursuant to block 516.

Referring to FIG. 5B, in accordance with example implementations, the thread decomposition engine 114 sorts, or ranks (block 520), the candidate matrix decompositions based on their corresponding individual fitness values. For example, in accordance with some implementations, the thread decomposition engine 114 orders the candidate matrix decompositions according to their fitness values in ascending order so that the candidate matrix decomposition that has the lowest corresponding fitness value is at the top of the ranking, i.e., is the highest ranked candidate matrix decomposition.

The thread decomposition engine 114 then, using the ranked candidate matrix decompositions, performs an iterative process (e.g., the iterative process set forth in blocks 524 and 528) for purposes of selecting the particular candidate matrix decomposition based on the ranking. More specifically, in accordance with example implementations, the thread decomposition engine 114 selects (block 524) the next candidate matrix decomposition based on the ranking. For example, for the initial selection, the thread decomposition engine 114 selects the top ranked candidate matrix decomposition. The thread decomposition engine 114 then determines (decision block 528) whether this candidate matrix decomposition is acceptable based on one or multiple selection criteria, as further described herein. If the candidate matrix decomposition is not acceptable, then, in accordance with example implementations, the thread decomposition engine 114 returns to block 524 to select the next candidate matrix decomposition that is next highest ranked (relative to the last selection) matrix decomposition and proceeds to decision block 528 to determine whether this candidate matrix decomposition is acceptable.

Based on the selection criterion or criteria, the thread decomposition engine 114 eventually selects a particular candidate matrix decomposition that is acceptable and then, pursuant to block 532, communicates data representing the block sizes of the selected matrix decomposition to the GEMM engine 110.

As examples of condition values that the thread decomposition engine 114 may use to determine the corresponding fitness values (pursuant to blocks 508, 512 and 516 of FIG. 5A), in accordance with example implementations, for M/K threading, the thread decomposition engine 114 may determine one or multiple (or all) of the following seven condition values for a candidate matrix decomposition for purposes of determining the fitness value:

Condition Value One: absolute difference between number of subblocks in K dimension and the minimum such value (prefer to use number of blocks, as set by BSK).

Condition Value Two: absolute difference between BSN and BSK block sizes.

Condition Value Three: normalized ceiling calculation of ratio of number of threads in M dimension and maximum number of decomposable blocks of input matrix B available for shared packing.

Condition Value Four: remainder of local size in M dimension divided by BSM block size.

Condition Value Five: difference between the $BSM_{opt}$ and BSM block sizes.

Condition Value Six: difference between the BSM and $BSM_{init}$ block sizes, if the BSM block size is strictly less than the $BSM_{init}$ block size.

Condition Value Seven: add one to if the BSK block value is not equal to the $BSK_{init}$ block size and also add one if the BSM block size is not equal to the $BSM_{init}$ block size (strict inequality).

In accordance with example implementations, for N/K threading, the thread decomposition engine 114 may determine one or multiple (or all) of the following eight condition values for a candidate matrix decomposition for purposes of determining the fitness value:

Condition Value One: absolute difference between number of subblocks in N dimension and the minimum such value (prefer to use number of blocks, as set by BSN).

Condition Value Two: absolute difference between the BSN and BSK block sizes.

Condition Value Three: zero if number of threads in N dimension is integer multiple of the number of processing cores per NUMA node, otherwise one.

Condition Value Four: zero if number of threads in N dimension is less than or equal to number of processing cores per NUMA node, otherwise one.

Condition Value Five: absolute difference between the number of threads in the N dimension and the number of processing cores per LLC.

Condition Value Six: normalized ceiling calculation of ratio of number of threads in N dimension and maximum number of decomposable blocks of input matrix A available for shared packing.

Condition Value Seven: difference between the BSN and $BSN_{init}$ block sizes, if the difference is strictly less than the $BSN_{init}$ block size.

Condition Value Eight: add one if the BSK block size not equal to the $BSK_{init}$ block size, and also add one if the BSN block size is not equal to the the $BSN_{init}$ block size (strict inequality).

In accordance with example implementations, the thread decomposition engine 114 subsequently normalizes (with respect to the largest value) each condition value across all possible candidate matrix decompositions to provide corresponding weighted contributions; and then, in accordance with example implementations, the thread decomposition engine 114 sums the condition values for each candidate matrix decomposition to determine a corresponding single fitness value for the candidate matrix decomposition. Next, the thread decomposition engine 114 sorts, or ranks, the candidate matrix decompositions in ascending order (e.g., ranks pursuant to block 520 of FIG. 5B) and selects the candidate matrix decomposition that has the minimum corresponding fitness value if the following conditions are satisfied.

In accordance with example implementations, for M/K threading, the thread decomposition engine 114 determines whether a particular candidate decomposition (which is identified by the ranking) is acceptable (e.g., performs decision block 528 of FIG. 5B) based on whether both of the following conditions are satisfied:

Condition One: number of threads in K dimension>1; and
Condition Two: the BSK block size is less than or equal to the BSM block size, or ceil(BSN/BSNR) is less than total number of threads.

In accordance with example implementations, for N/K threading, the thread decomposition engine 114 selects the candidate matrix decomposition (identified by the ranking) is acceptable (e.g., performs decision block 528 of FIG. 5B) if both of the following condition values are satisfied:

Condition One: number of threads in K dimension>1; and
Condition Value Two: the BSK block size is less than or equal to the BSN block size, or ceil(BSM/BSMR) is less than total number of threads.

If condition values are not satisfied for a given candidate matrix decomposition identified by the ranking, then the next highest candidate matrix decomposition is selected and the corresponding condition values are then re-evaluated, as discussed above in connection with FIGS. 5A and 5B.

Figure 4:
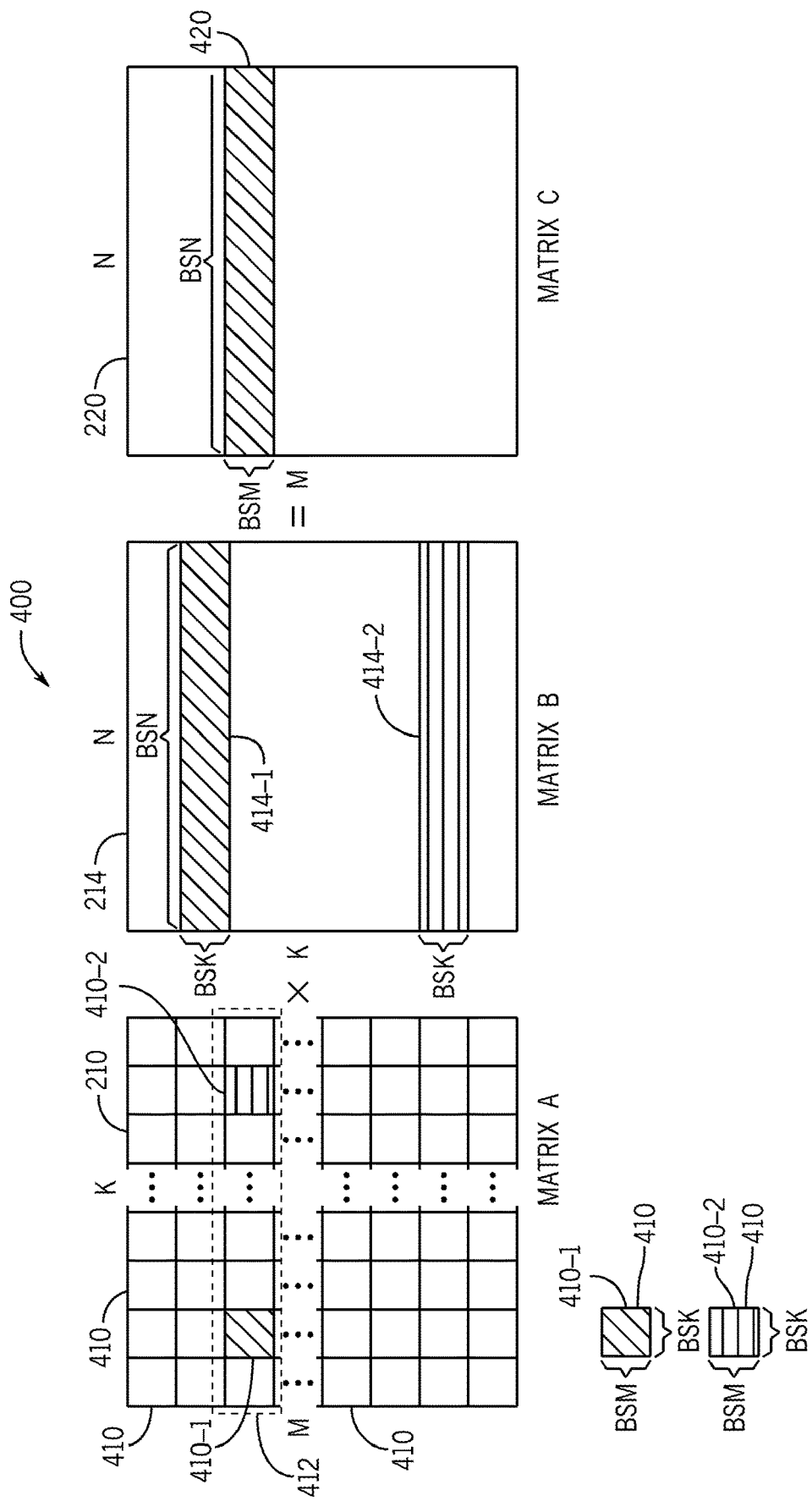
FIG. 4 is an illustration of matrix-matrix multiplication processing by a K group of processing threads according to an example implementation.

FIG. 4 is an example illustration 400 of M/K threading and in particular, illustrates the partitioning of the input matrix A 210 into corresponding blocks 410, where each block BSM×BSK 410 is assigned to a particular processing thread 112 (FIG. 1). It is noted that although the example illustration 400 depicts the BSN block size as being equal to N (i.e., the number of columns of the input matrix B 214 and the number of columns of the output matrix C 220), in accordance with further example implementations, the BSN block size may be less than N. It is noted that although the block 410 is depicted in FIG. 4 as being square, the block 410 may be rectangular, as the BSM and BSK block sizes may be different. A particular K group of processing threads 112 (such as a K group of processing threads, which corresponds to the blocks 410 of a row 412 of blocks 410 in FIG. 4) collectively determines a corresponding BSM×BSN block 420 of the output matrix C 220. In other words, the processing thread that corresponds to each block 410 of the row 412 calculates part of the BSM×BSN block 420 of the output matrix C 220. For example, the processing thread 112 that is assigned to, for example, the block 410-1 of the row 412 performs matrix multiplication operations based on the block 410-1 and a block 414-1 of the input matrix B 214 to produce a corresponding contribution to the block 420 of the output matrix C 220. As another example, the processing thread 112 that is assigned to block 410-2 performs matrix multiplication operations based on the block 410-2 and a block 414-2 of the input matrix B 214 to produce another contribution to the block 420 of the output matrix C 220. Because the processing threads 112 in a given K group update the same shared BSM×BSN block of the output matrix C, there may be possible memory resource contention by these processing threads 112.

In accordance with example implementations, the contention mitigation engine 118 (FIG. 1) determines an optimal decomposition of the blocks of the output matrix 220 in the M and/or N dimensions in a way that allows the processing threads 112 in a given K group to perform matrix-matrix multiplication operations more efficiently by accessing smaller blocks of data. The further subdivision along the M and/or N dimensions allows each processing thread 112 to "sub-cycle" over the corresponding sub-blocks. Thus, as part of the sub-cycling, each processing thread 112 processes its associated sub-blocks one at a time in accordance with the loops 316 and 320 of FIG. 3.

Figure 6:
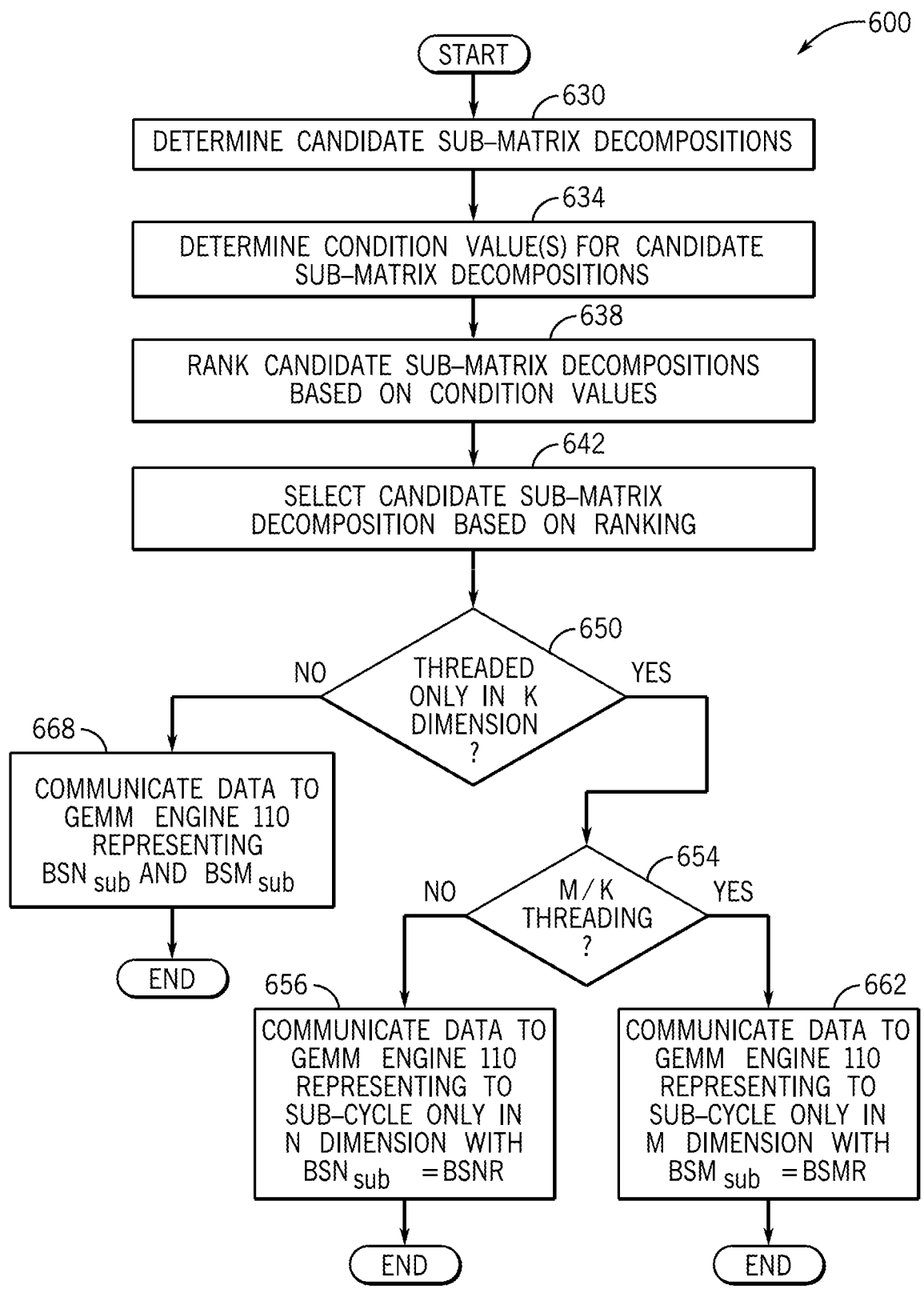
FIG. 6 is a flow diagram depicting a process to determine sub-block sizes for processing thread sub-cycling according to an example implementation.

FIG. 6 illustrates a process 600 used by the contention mitigation engine 118 to further decompose the M and/or N dimensions in accordance with example implementations. Referring to FIG. 6 in conjunction with FIG. 1, in accordance with example implementations, the contention mitigation engine 118 determines (block 630) candidate sub-matrix decompositions by considering all divisors of the number of threads in a given K group. More specifically, in accordance with example implementations, the contention mitigation engine 118 may determine (block 634) a set of condition values for each candidate sub-matrix decomposition and determine a fitness value for each set of condition values. For example, in accordance with example implementations, the contention mitigation engine 118 may determine a fitness value for each candidate sub-matrix decomposition based on the following condition values:

Condition Value One: add one if the $BSM_{sub}$ sub-block size is greater than or equal to the $BSN_{sub}$ block size (i.e., there is a preference for the M dimension to be larger than the N dimension).

Condition Value Two: add one if the $BSN_{sub}$ sub-block size is equal to the $BSN_{opt}$ block size (i.e., there is a preference to use the optimal cache block size for the N dimension).

The contention mitigation engine 118 may sort, or rank, the candidate sub-matrix decompositions based on the associated condition values, pursuant to block 638 (e.g., rank the sub-matrix decompositions based on fitness values determined from the condition values). The contention mitigation engine 118 may then select (block 642) the sub-matrix decomposition based on the ranking. For example, in accordance with some implementations, the contention mitigation engine 118 may rank the candidate sub-matrix decompositions based on their corresponding fitness values in descending order, and the contention mitigation engine 118 may then select the candidate sub-matrix decomposition that has the largest corresponding fitness value, as determined from the two condition values above.

The contention mitigation engine 118 may then determine (decision block 650) whether the particular matrix decomposition threads only in the K dimension and if so, makes a determination (decision block 654) whether M/K threading is used. For M/K threading (i.e., the "Yes" prong of decision block 654), the contention mitigation engine 118 communicates (block 662) data to the GEMM engine 110 representing to sub-cycle only in the M dimension with the M dimension being subdivided according to an M dimension sub-block size ($BSM_{sub}$) that is equal to the BSMR block size. Otherwise, if threading occurs only in the K dimension and N/K threading is used (the "No" prong of decision block 662), then, pursuant to block 656, the contention mitigation engine 118 communicates data to the GEMM engine 110 representing to sub-cycle only in the N dimension, with the N dimension according to an N dimension sub-block size ($BSN_{sub}$) that is equal to the BSNR block size. If threading occurs in a dimension other than the K dimension (the "No" prong of decision block 650), then, pursuant to the process 600, the contention mitigation engine 118 communicates (block 668) data to the GEMM engine 110 representing the $BSN_{sub}$ and $BSM_{sub}$ values.

In accordance with some implementations, the contention mitigation engine 118 may make a recommendation of whether each K processing thread group is to use a temporary local buffer to derive the corresponding BSM×BSN block of the output matrix C, such that when the processing thread K group completes the processing for this block, the content of the temporary local buffer may be transferred to the output buffer for the output matrix C. In accordance with some implementations, the local temporary buffer is aligned with cache boundaries, and updates to the temporary local buffer are additive in nature.

Figure 7:
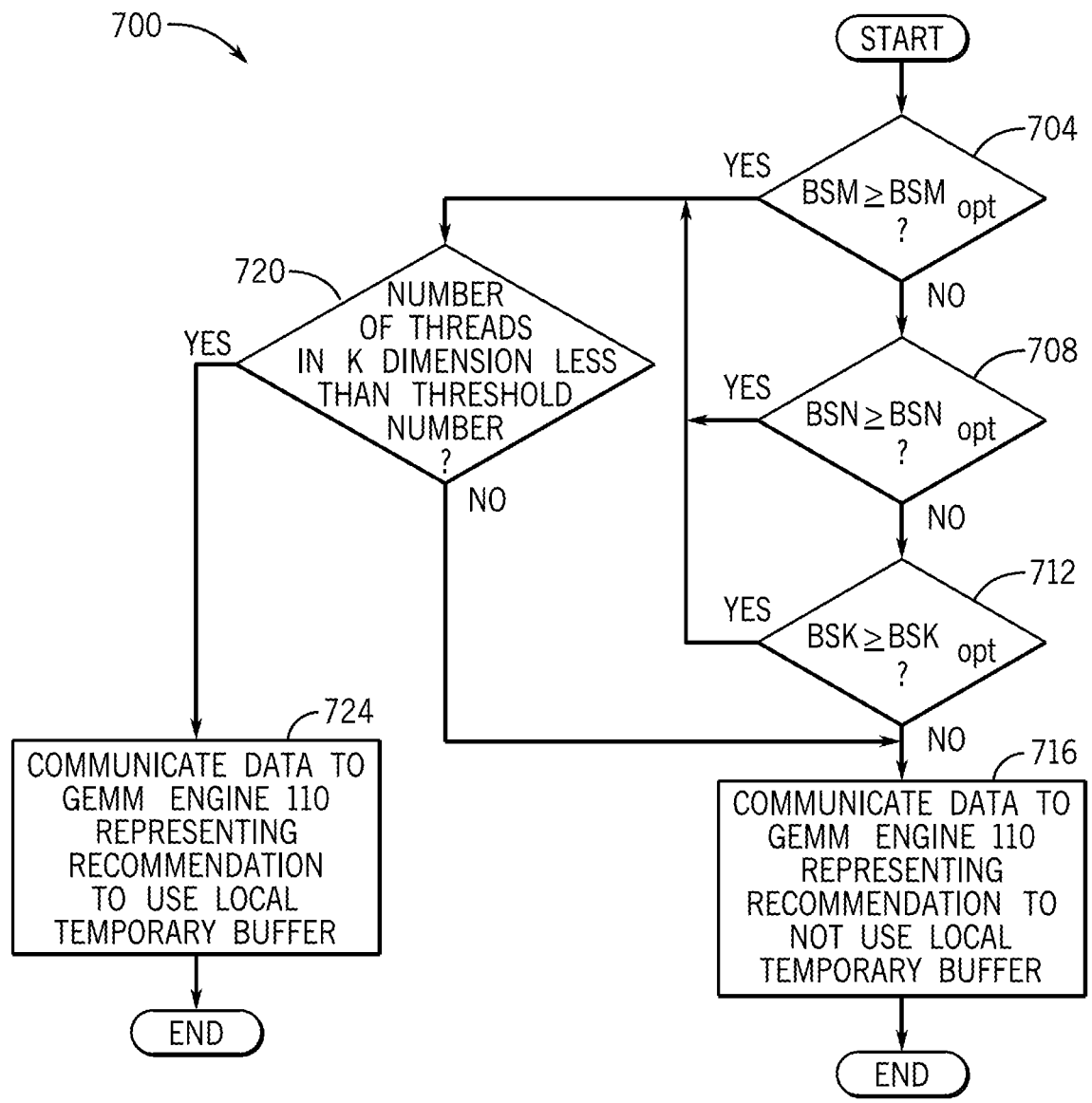
FIG. 7 is a flow diagram depicting a process to determine whether or not to recommend use of a local temporary buffer to mitigate processing thread contention according to an example implementation.

The contention mitigation engine 118 may perform a process 700 that is depicted in FIG. 7 for purposes of determining whether or not to recommend the use of the temporary local output buffer. In accordance with example implementations, the process 700 involves the contention mitigation engine 118 recommending the use of the temporary local output buffer if two prongs of a two-prong test are satisfied. Otherwise, the contention mitigation engine 118 does not recommend use of the temporary local output buffer. Referring to FIG. 7 in conjunction with FIG. 1, in accordance with example implementations, for the first prong, the contention mitigation engine 118 determines whether any of the BSM block size (decision block 704), BSN block size (decision block 708) or BSK block size (decision block 712) is equal to or greater than the optimal block sizes $BSM_{opt}$, $BSN_{opt}$ and $BSK_{opt}$, respectively. If so, then the first prong has been satisfied, and the contention mitigation engine 118, for the second prong, determines (decision block 720) whether the number of threads in the K dimension is less than a predetermined threshold number (e.g., a threshold number of "8"). If the number of threads in the K dimension is greater than this predetermined threshold, then, in accordance with example implementations, both prongs have been satisfied, and the contention mitigation engine 118 recommends the use of the local temporary buffer and communicates data (block 724) with this recommendation. Otherwise, if either prong is not satisfied, then, in accordance with example implementations, the contention mitigation engine 118 communicates data to the GEMM engine 110 representing to not use a local temporary output buffer, as depicted in block 716.

Referring back to FIG. 1, in accordance with some implementations, the GEMM engine 110 may have one or more of the following load balancing features. The GEMM engine 110 adjusts the number of threads cooperatively packing a shared block of either matrix A and/or B by means of a fair sharing principle to help improve group synchronization. If using a local temporary output buffer with sub-cycling, then the GEMM engine 110 computes the GEMM solution for the specified sub-block and uses a non-blocking loop over the update function. If the GEMM engine 110 uses a local temporary output buffer without sub-cycling, then the GEMM engine 110 computes the GEMM solution and then immediately calls the update function for the specified sub-block. If the GEMM engine 110 uses sub-cycling without a local temporary output buffer, then, within a loop, the GEMM engine 110 locally packs the input matrix A or B and waits for a lock to compute the GEMM solution that updates the output matrix C. If the GEMM engine 110 neither using sub-cycling nor a local temporary output buffer, then the GEMM engine 110 waits for a lock to compute the GEMM solution that updates the output matrix C.

As a specific example of outputs for the thread decomposition engine 114 and contention mitigation engine 118, for sixteen processing threads 112, the engines 114 and 118 may determine block sizes, sub-block sizes and other parameters for the following matrices: matrix A (192×3,840), matrix B (3,840×96), and matrix C (192×96). It is assumed for this example that the CPU 102 that has sixty-four processing cores, four NUMA domains and four processing cores sharing a last level cache (LLC). It is also assumed for this example that N/K threading is used.

For this example, the thread decomposition engine 114 evaluates the following M×N×K candidate decompositions: 1×1×16, 1×2×8, 1×4×4, 1×8×2 and 1×16×1, although 1×16×1 is invalid (because there is no partitioning in the N dimension). Given the selection criteria, the thread decomposition engine 114 selects the 1×1×16 decomposition, so threading will only be over the K dimension. The thread decomposition engine 114 selects the BSM, BSN and BSK block sizes for this example to be 192/96/240.

For this example, the contention mitigation engine 118 determines to sub-cycle over the M dimension with BSMR-size blocks. Moreover, for this example, the contention mitigation engine 118 determines to not recommend the use of a local temporary output buffer.

As another example, for the above-described example computer system, the thread decomposition engine 114 and contention mitigation engine 118 may process the following matrices: matrix A (96×3,840), matrix B (3,840×192), and matrix C (96×192). It is assumed for this example that N/K threading is used.

For this example, the thread decomposition engine 114 evaluates the following candidate M×N×K decompositions: 1×1×16, 1×2×8, 1×4×4, 1×8×2 and 1×16×1, although 1×16×1 is invalid (due to no threading or decomposition occurring along the N dimension). Based on the selection criteria, the thread decomposition engine 114 selects the 1×4×4 decomposition, so that threading will be over the N and K dimensions. For this example, the thread decomposition engine 114 selects the BSM/BSN/BSK blocks to be 96/48/960.

For this second example, the contention mitigation engine 118 sub-cycles over the M and N dimensions. Moreover, for this second example, the contention mitigation engine 118 recommends to use a local temporary output buffer to improve efficiency.

Figure 8:
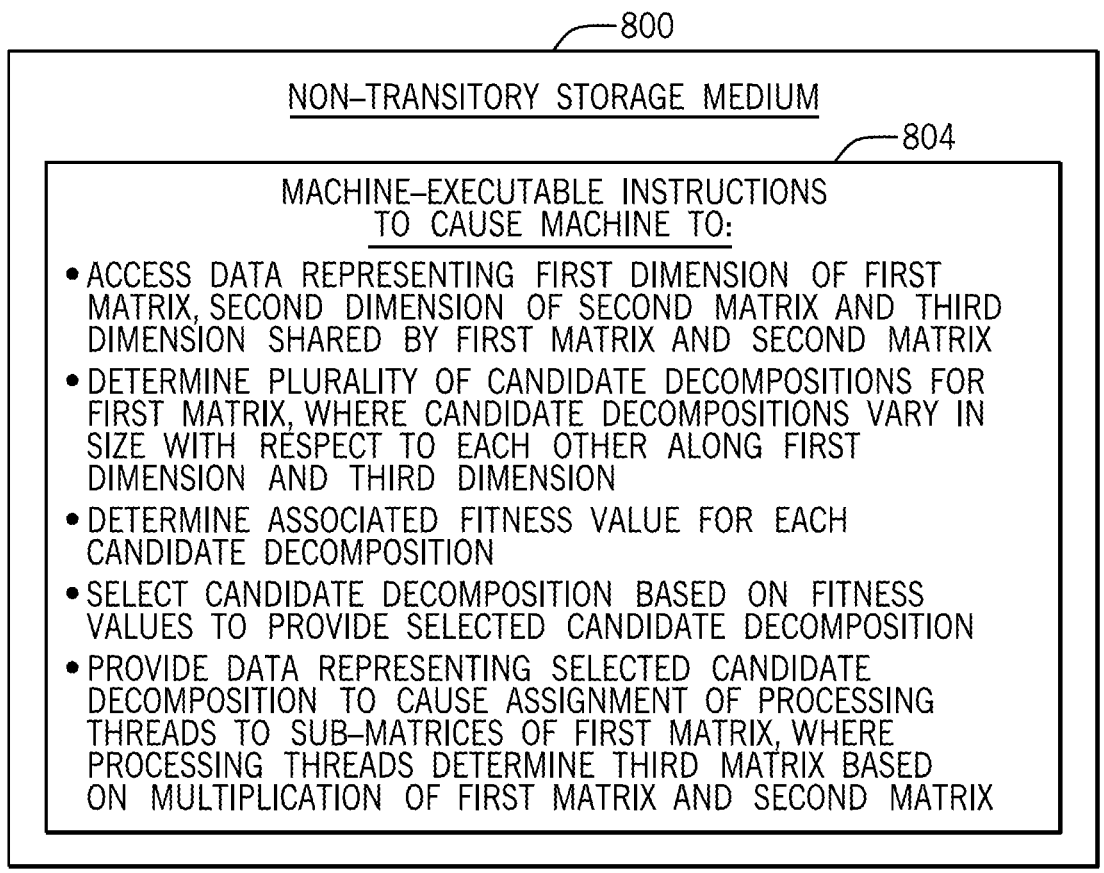
FIG. 8 is an illustration of a non-transitory storage medium storing machine-executable instructions that, when executed by the machine, cause the machine to provide data representing a decomposition for processing thread assignment according to an example implementation.

Referring to FIG. 8, in accordance with example implementations, a non-transitory storage medium 800 stores machine-readable instructions 804 that, when executed by a machine, cause the machine to access data representing a first dimension of a first matrix, a second dimension of a second matrix, and a third dimension shared by the first matrix and the second matrix. The instructions 804, when executed by the machine, further cause the machine to determine a plurality of candidate decompositions for the first matrix, where the candidate decompositions vary in size with respect to each other along the first dimension and the third dimension. The instructions 804, when executed by the machine, further cause the machine to determine an associated fitness value for each candidate decomposition of the plurality of candidate decompositions; and select a candidate decomposition of the plurality of candidate decompositions based on the fitness values to provide a selected candidate decomposition. The instructions 804, when executed by the machine, further cause the machine to provide data representing the selected candidate decomposition to cause the assignment of processing threads to sub-matrices of the first matrix. The processing threads determine a third matrix based on a multiplication of the first matrix and the second matrix.

Figure 9:
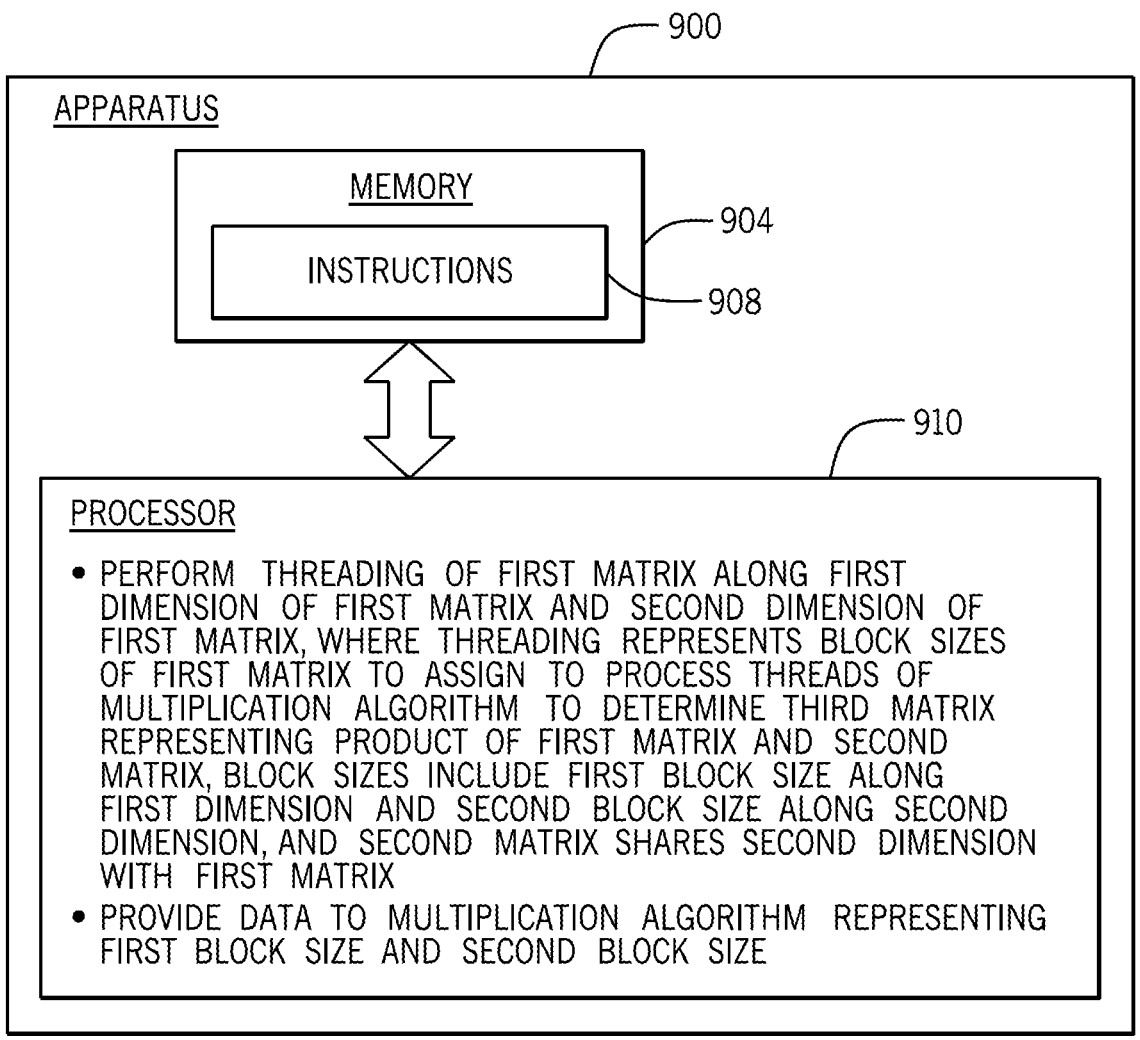
FIG. 9 is a schematic diagram of an apparatus that includes a processor to provide data representing block sizes for threading by a multiplication algorithm according to an example implementation.

Referring to FIG. 9, in accordance with example implementations, an apparatus 900 includes a processor 910 and a memory 904 to store instructions 908. The instructions 908, when executed by the processor 910, cause the processor 910 to perform threading of a first matrix along a first dimension of the first matrix and a second dimension of the matrix. The threading represents block sizes of the first matrix to assign to process threads of a multiplication algorithm to determine a third matrix that represents a product of the first matrix and a second matrix. The block sizes include a first block size along the first dimension and a second block size along the second dimension. The second matrix shares the second dimension with the first matrix. The instructions 908, when executed by the processor 910, cause the processor 910 to provide data to the multiplication algorithm, which represents the first block size and the second block size.

Figure 10:
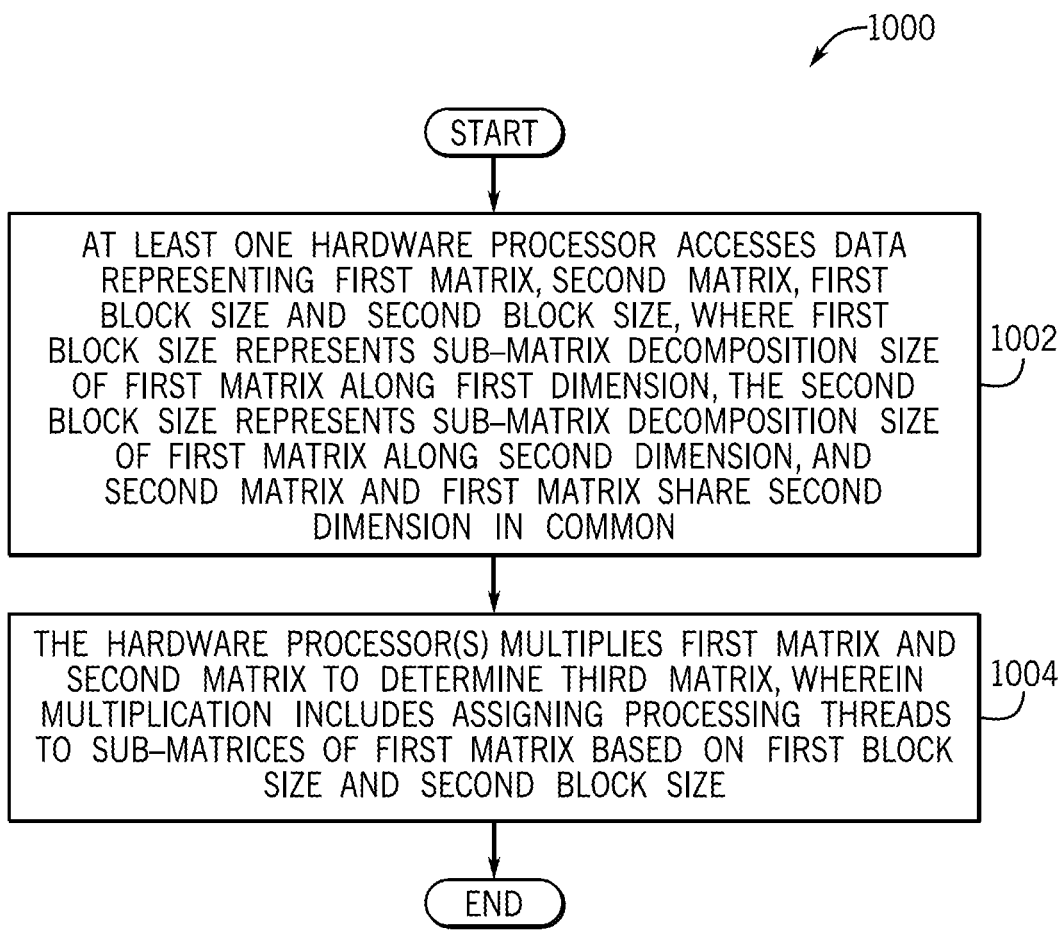
FIG. 10 is a flow diagram depicting a process to multiply matrices according to an example implementation.

Referring to FIG. 10, in accordance with example implementations, a technique 1000 includes at least one hardware processor, accessing (block 1002) data, which represents a first matrix, a second matrix, a first block size and a second block size. The first block size represents a sub-matrix decomposition size of the first matrix along a first dimension; and the second block size represents a sub-matrix decomposition size of the first matrix along the second dimension. The second matrix and the first matrix share the second dimension in common. The technique 1000 includes the hardware processor(s) multiplying (block 1004) the first matrix and the second matrix to determine a third matrix. The multiplication includes assigning processing threads to sub-matrices of the first matrix based on the first block size and the second block size.

In accordance with example implementations, a block size for the plurality of candidate decompositions is determined along the third dimension such that the plurality of candidate decompositions each are decomposed along the third dimension according to the block size. A particular advantage is that processing efficiency of matrix-matrix multiplication may be enhanced.

In accordance with example implementations, the block size may be determined based on a characteristic of a cache memory that is used by the processing threads to determine the third matrix. A particular advantage is that processing efficiency of matrix-matrix multiplication may be enhanced.

In accordance with example implementations, for each fitness value, a plurality of conditions for the associated candidate decomposition is determined; and each fitness value is determined based on the plurality of conditions. A particular advantage is that processing efficiency of matrix-matrix multiplication may be enhanced.

In accordance with example implementations, for each fitness value, each condition of the plurality of conditions is normalized to provide a plurality of normalized condition values. The plurality of normalized condition values are combined to determine the fitness value. A particular advantage is that processing efficiency of matrix-matrix multiplication may be enhanced.

In accordance with example implementations, the fitness values are ranked to provide a corresponding ranking of the plurality of candidate decompositions. The selected candidate decomposition is selected based on the ranking. A particular advantage is that processing efficiency of matrix-matrix multiplication may be enhanced.

In accordance with example implementations, a first candidate decomposition is selected based on the ranking; and a determination is made that the first candidate decomposition does not satisfy a selection criterion. A second candidate decomposition other than the first candidate decomposition is selected based on the ranking; and a determination is made that the second candidate decomposition satisfies the selection criterion. The second candidate decomposition is determined to be the selected candidate decomposition. A particular advantage is that processing efficiency of matrix-matrix multiplication may be enhanced.

In accordance with example implementations, the selected candidate decomposition corresponds to the third matrix being sub-divided into a plurality of sub-matrices. Each sub-matrix is associated with a group of processes and a determination is made of a sub-matrix decomposition for the plurality of sub-matrices. Data representing the sub-matrix decomposition is provided to cause each processing thread to sub-cycle based on the sub-matrix decomposition. A particular advantage is that processing efficiency of matrix-matrix multiplication may be enhanced.

In accordance with example implementations, a determination is made, based on the characteristic(s) of the selected candidate decomposition, whether to recommend the use of a buffer to store preliminary results of the multiplication. A routine updates the third matrix using additive updates from content that is stored in the buffer. A particular advantage is that processing efficiency of matrix-matrix multiplication may be enhanced.

While the present disclosure has been described with respect to a limited number of implementations, those skilled in the art, having the benefit of this disclosure, will appreciate numerous modifications and variations therefrom. It is intended that the appended claims cover all such modifications and variations.

What is claimed is:

1. A non-transitory storage medium that stores machine-readable instructions that, when executed by a machine, cause the machine to:
   access data representing a first dimension of a first matrix, a second dimension of a second matrix and a third dimension shared by the first matrix and the second matrix,
   determine a plurality of candidate decompositions for the first matrix, wherein the candidate decompositions vary in size with respect to each other along the first dimension and the third dimension;
   determine an associated fitness value for each candidate decomposition of the plurality of candidate decompositions;
   select a candidate decomposition of the plurality of candidate decompositions based on the fitness values to provide a selected candidate decomposition; and
   provide data representing the selected candidate decomposition to cause the assignment of processing threads to sub-matrices of the first matrix, wherein the processing threads determine a third matrix based on a multiplication of the first matrix and the second matrix.

2. The storage medium of claim 1, wherein the instructions, when executed by the machine, further cause the machine to determine a block size for the plurality of candidate decompositions such that each candidate decomposition of the plurality of candidate decompositions is decomposed along the third dimension according to the block size.

3. The storage medium of claim 2, wherein the instructions, when executed by the machine, further cause the machine to determine the block size based on a characteristic of a cache memory used by the processing threads in the determination of the third matrix.

4. The storage medium of claim 1, wherein the instructions, when executed by the machine, further cause the machine to:
   for each fitness value of the fitness values:
      determine a plurality of conditions for the associated candidate decomposition; and
      determine the each fitness value based on the plurality of conditions.

5. The storage medium of claim 4, wherein the instructions, when executed by the machine, further cause the machine to:
   for the each fitness value:
      normalize each condition of the plurality of conditions to provide a plurality of normalized condition values; and
      combine plurality of normalized condition values to determine the each fitness value.

6. The storage medium of claim 1, wherein the instructions, when executed by the machine, further cause the machine to:
   rank the fitness values to provide a corresponding ranking of the plurality of candidate decompositions; and
   select the selected candidate decomposition based on the ranking.

7. The storage medium of claim 6, wherein the instructions, when executed by the machine, further cause the machine to:
   select a first candidate decomposition based on the ranking;
   determine that the first candidate decomposition does not satisfy a selection criterion;
   select a second candidate decomposition other than the first candidate decomposition based on the ranking;
   determine that the second candidate decomposition satisfies the selection criterion; and
   determine the second candidate decomposition to be the selected candidate decomposition.

8. The storage medium of claim 1, wherein the selected candidate decomposition corresponds to the third matrix being sub-divided into a plurality of sub-matrices, wherein each sub-matrix of the plurality of sub-matrices is associated with a group of processes of the plurality of processes, and the instructions, when executed by the machine, further cause the machine to:
   determine a plurality of candidate sub-matrix decompositions, wherein the candidate sub-matrix decompositions vary in size with respect to each other along the first dimension and the second dimension;
   determine an associated second fitness value for each candidate sub-matrix decomposition of the plurality of candidate sub-matrix decompositions;
   select a candidate sub-matrix decomposition of the plurality of candidate sub-matrix decompositions based on the second fitness values to provide a selected candidate sub-matrix decomposition; and
   provide data representing the selected candidate sub-matrix decomposition to cause each processing thread of the processing threads to sub-cycle based on the selected sub-matrix decomposition.

9. The storage medium of claim 1, wherein the selected candidate decomposition corresponds to the third matrix being sub-divided into a plurality of sub-matrices, wherein each sub-matrix of the plurality of sub-matrices is associated with a group of processes of the plurality of processes, and the instructions, when executed by the machine, further cause the machine to:
   determine a sub-matrix decomposition for the plurality of sub-matrices; and
   provide data representing the sub-matrix decomposition to cause each processing thread of the processing threads to sub-cycle based on the sub-matrix decomposition.

10. The storage medium of claim 1, wherein the instructions, when executed by the machine, further cause the machine to determine, based on at least one characteristic of the selected candidate decomposition, whether to recommend use of a buffer to store preliminary results of the multiplication, wherein a routine updates the third matrix using additive updates from content stored in the buffer.

11. The storage medium of claim 10, wherein the instructions, when executed by the machine, further cause the machine to determine whether to recommend the use of the buffer based on at least one of the following: a comparison of a first block size of the candidate decomposition along the first dimension to a first cache optimum block size along the first dimension, a comparison of a second block size of the candidate decomposition along the second dimension to a second cache optimum block size along the second dimension, or a comparison of a third block size of the candidate decomposition along the third dimension to a third cache optimum block size along the third dimension.

12. The storage medium of claim 1, wherein:
the first matrix comprises an M×K matrix, the second matrix comprises a K×N matrix;
the first dimension corresponds to an M dimension of the M×K matrix;
the second dimension corresponds to a N dimension of the K×N matrix;
the third dimension corresponds to the K dimension of the M×K matrix and the K dimension of the K×N matrix;
the multiplication comprises a (M×K)(K×N) matrix multiplication; and
determining the plurality of candidate decompositions for the first matrix comprises M/K threading.

13. The storage medium of claim 1, wherein:
the second matrix comprises an M×K matrix, the first matrix comprises a K×N matrix;
the first dimension corresponds to an N dimension of the K×N matrix;
the second dimension corresponds to an M dimension of the M×K matrix;
the third dimension corresponds to the K dimension of the M×K matrix and the K dimension of the K×N matrix;
the multiplication comprises a (M×K)(K×N) matrix multiplication; and
determining the plurality of candidate decompositions for the first matrix comprises N/K threading.

14. An apparatus comprising:
a processor; and
a memory to store instructions that, when executed by the processor, cause the processor to:
perform threading of a first matrix along a first dimension of the first matrix and a second dimension of the matrix, wherein the threading represents block sizes of the first matrix to assign to process threads of a multiplication algorithm to determine a third matrix representing a product of the first matrix and a second matrix, the block sizes comprise a first block size along the first dimension and a second block size along the second dimension, and the second matrix shares the second dimension with the first matrix; and
provide data to the multiplication algorithm representing the first block size and the second block size.

15. The apparatus of claim 14, wherein the multiplication algorithm comprises a generalized matrix-matrix multiplication (GEMM) algorithm.

16. The apparatus of claim 14, wherein the instructions, when executed by the processor, further cause the processor to:
determine the second block size; and
evaluate candidate matrix decompositions that are each decomposed along the second dimension according to the second block size, wherein the evaluation is used to determine the second block size.

17. The apparatus of claim 14, wherein the threading corresponds to the third matrix being sub-divided into a plurality of sub-matrices, wherein each sub-matrix of the plurality of sub-matrices is associated with a group of threads of the plurality of threads, and the instructions, when executed by the processor, further cause the processor to:
determine a sub-matrix decomposition for the plurality of sub-matrices; and
provide data representing the sub-matrix decomposition to cause each thread of the plurality of threads to sub-cycle based on the sub-matrix decomposition.

18. The apparatus of claim 14, wherein the instructions, when executed by the processor, further cause the processor to determine, based on at least one of the block sizes, whether to recommend use of a buffer to store preliminary results of the multiplication, wherein a routine updates the third matrix using additive updates from content stored in the buffer.

19. A method comprising:
at least one hardware processor, accessing data representing a first matrix, a second matrix, a first block size and a second block size, wherein the first block size represents a sub-matrix decomposition size of the first matrix along a first dimension, the second block size represents a sub-matrix decomposition size of the first matrix along the second dimension, and the second matrix and the first matrix share the second dimension in common; and
the at least one hardware processor multiplying the first matrix and the second matrix to determine a third matrix, wherein the multiplying comprises assigning processing threads to sub-matrices of the first matrix based on the first block size and the second block size.

20. The method of claim 19, wherein the multiplying comprises each processing thread of the processing threads sub-cycling over sub-blocks of the sub-matrix assigned to the processing thread.

* * * * *